United States Patent
Chen et al.

(10) Patent No.: US 12,293,122 B2
(45) Date of Patent: May 6, 2025

(54) DATA TRANSMISSION SYSTEM, METHOD, SERVICE SYSTEM, DEVICE, AND STORAGE MEDIUM

(71) Applicant: Beijing Volcano Engine Technology Co., Ltd., Beijing (CN)

(72) Inventors: Huguanshen Chen, Beijing (CN); Yang Zhang, Beijing (CN); Haozhong Zhang, Beijing (CN); Yibo Zhou, Beijing (CN); Ying Fang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/668,903

(22) Filed: May 20, 2024

(65) Prior Publication Data

US 2024/0303019 A1  Sep. 12, 2024

Related U.S. Application Data

(63) Continuation of application No. PCT/CN2023/081054, filed on Mar. 13, 2023.

(30) Foreign Application Priority Data

Mar. 21, 2022 (CN) .......................... 202210279108.3

(51) Int. Cl.
*G06F 3/14* (2006.01)
*H04L 67/141* (2022.01)

(52) U.S. Cl.
CPC .............. *G06F 3/14* (2013.01); *H04L 67/141* (2013.01)

(58) Field of Classification Search
CPC .................................. G06F 3/14; H04L 67/141
See application file for complete search history.

(56) References Cited

U.S. PATENT DOCUMENTS

| | | | |
|---|---|---|---|
| 2011/0179106 A1* | 7/2011 | Hulse ................... | H04N 21/482 |
| | | | 709/227 |
| 2019/0227820 A1* | 7/2019 | Wang ................... | G06F 3/0481 |
| (Continued) | | | |

FOREIGN PATENT DOCUMENTS

| | | |
|---|---|---|
| CN | 109656646 A | 4/2019 |
| CN | 109660581 A | 4/2019 |
| (Continued) | | |

OTHER PUBLICATIONS

International Patent Application No. PCT/CN2023/081054; Int'l Search Report; dated May 31, 2023; 2 pages.

(Continued)

*Primary Examiner* — Muhammad N Edun
(74) *Attorney, Agent, or Firm* — BakerHostetler

(57) ABSTRACT

The present disclosure provides a data transmission system a method, a service system, a device, and a storage medium. The system comprises: a user terminal provided for generating, in response to an input operation of a user, a virtual network console VNC operation instruction, and sending the VNC operation instruction to a data processor DPU; the DPU, hard-wired with a server and configured with a virtual display device and a virtual input device, provided for simulating, through the virtual input device, an input operation indicated by the VNC operation instruction, and transmitting generated input operation signals to the server; the server provided for, in response to the input operation signals, generating display data after receiving the input operation signals, and transmitting the display data to the DPU.

15 Claims, 2 Drawing Sheets

(56) References Cited

U.S. PATENT DOCUMENTS

| | | | |
|---|---|---|---|
| 2019/0325653 A1* | 10/2019 | Yip | .................... G06F 3/04883 |
| 2020/0133616 A1 | 4/2020 | Zong et al. | |
| 2022/0021745 A1 | 1/2022 | Thai et al. | |
| 2024/0037060 A1* | 2/2024 | Ren | .................... G06F 13/4282 |

FOREIGN PATENT DOCUMENTS

| | | |
|---|---|---|
| CN | 109697102 A | 4/2019 |
| CN | 112596852 A | 4/2021 |
| CN | 112764872 A | 5/2021 |
| CN | 114610259 A | 6/2022 |

OTHER PUBLICATIONS

Anonymous -Wikipedia: "VNC—Wikipedia", Dec. 11, 2021 (Dec. 11, 2021), pp. 1-5, XP093248903, Retrieved from the Internet: URL:https://en.wikipedia.org/w/index.php?title=VNColdid=1059733160.

The Extended European Search Report for European Application No. 23773643.4, mailed Feb. 19, 2025, 10 Pages.

* cited by examiner

DATA TRANSMISSION SYSTEM, METHOD, SERVICE SYSTEM, DEVICE, AND STORAGE MEDIUM

CROSS-REFERENCE TO RELATED APPLICATION(S)

The present application is a continuation of International Patent Application No. PCT/CN2023/081054, filed on Mar. 13, 2023, which claims the priority of Chinese Patent Application No. 202210279108.3, filed on Mar. 21, 2022, all of which are incorporated herein by reference in their entireties.

FIELD

The present disclosure relates to computer technology field, and more specifically to data transmission system, method, service system, device, and storage medium.

BACKGROUND

Users operate servers through graphic interfaces. Traditional operation methods, for example, include calling KVM over IP through a Baseboard Manager Controller (BMC) configured external to the server. In other words, a display interface is implemented by Keyboard, Video, Mouse (KVM) with remote management functions and interactive operations are performed based on the input device, such as mouse and keyboard etc.

However, the above traditional methods are not universal among users as the permission for calling BMC operation is quite high.

SUMMARY

Embodiments of the present disclosure at least provide data transmission system, method, service system, device, and storage medium.

In a first aspect, embodiments of the present disclosure provide a data transmission system, comprising:

a user terminal provided for generating, in response to an input operation of a user, a virtual network console VNC operation instruction, and sending the VNC operation instruction to a data processor DPU;

the DPU, hard-wired with a server and configured with a virtual display device and a virtual input device, provided for simulating, through the virtual input device, an input operation indicated by the VNC operation instruction, and transmitting generated input operation signals to the server;

the server provided for generating, in response to the input operation signals, display data after receiving the input operation signals, and transmitting the display data to the DPU;

the DPU is further provided for rendering the display data transmitted by the server through the virtual display device, and sending display contents resulted from the rendering to the user terminal;

the user terminal is further provided for presenting the received display contents.

In an optional implementation, the user terminal has a VNC client run thereon, the DPU has a VNC server end run thereon, and the VNC client and the VCN server end are communicatively connected;

the DPU is provided for running the VNC server end after rendering the display data transmitted by the server through the virtual display device, and sending the display contents resulted from the rendering to the VNC client through the VNC server end;

the user terminal is provided for displaying the display contents received by the VNC client.

In one optional implementation, the DPU is configured with a corresponding display device memory space for the virtual display device;

the DPU is specifically provided for storing the display contents resulted from the rendering into the display device memory space after rendering the display data transmitted by the server through the virtual display device, running the VNC server end, controlling the VNC server end to read the display contents in the display device memory space, and sending the read display contents to the VNC client.

In one optional implementation, the DPU is further provided for establishing, before receiving the VNC operation instruction sent by the user terminal, a communication connection between the VNC client and the VNC server end in response to receiving a connecting request initiated by the VNC client.

In one optional implementation, the server is configured with a display device driver and an input device driver;

the server is specifically provided for loading the display device driver and the input device driver after start-up, driving a virtual display device in the DPU to work through the display device driver, and driving a virtual input device in the DPU to work through the input device driver.

In one optional implementation, the server is further configured with a drawing software and a driver memory space corresponding to the display device driver;

the server is specifically provider for calling, based on the input operation signals, the drawing software to write the display data into the driver memory space, and reading the display data from the driver memory space and transmitting to the DPU.

In a second aspect, embodiments of the present disclosure also provide a service system, comprising:

a data processor DPU, hard-wired with a server and configured with a virtual display device and a virtual input device, provided for simulating through the virtual input device an input operation indicated by a VNC operation instruction, and transmitting generated input operation signals to the server, wherein the VNC operation instruction is generated by a user terminal in response to an input operation of a user;

the server provided for generating, in response to the input operation signals, display data after receiving the input operation signals, and transmitting the display data to the DPU;

the DPU is further provided for rendering the display data transmitted by the server through the virtual display device, and sending display contents resulted from the rendering to the user terminal.

In a third aspect, embodiments of the present disclosure also provide a data transmission method, comprising:

receiving a virtual network console VNC operation instruction sent by a user terminal;

simulating, through a virtual input device, an input operation indicated by the VNC operation instruction to generate input operation signals, wherein the VNC operation instruction are generated by the user terminal in response to an input operation of a user;

generating, in response to the input operation signals, display data;

rendering, through a virtual display device, the display data, and sending display contents resulted from the rendering to the user terminal.

In one optional implementation, the user terminal has a VNC client run thereon;

sending display contents resulted from the rendering to the user terminal includes:

sending the display contents resulted from the rendering to the VNC client through a VNC server end.

In one optional implementation, sending the display contents resulted from the rendering to the VNC client through a VNC server end includes:

storing the display contents resulted from the rendering into a display device memory space;

reading the display contents in the display device memory space, and sending the read display contents to the VNC client.

In one optional implementation, further including, after generating, in response to the input operation signals, display data:

calling, based on the input operation signals, a drawing software to write the display data into a driver memory space;

reading the display data from the driver memory space and transmitting to the virtual display device.

In a fourth aspect, embodiments of the present disclosure also provide a computer device, comprising: a processor, a memory, and a bus; wherein the memory stores machine-readable instructions executable by the processor; during operation of the computer device, the processor communicates with the memory via the bus; the machine-readable instructions, when executed by the processor, perform the above third aspect or steps of any possible data transmission method according to the third aspect.

In a fifth aspect, embodiments of the present disclosure also provide a computer-readable storage medium characterized in that the computer-readable storage medium has computer programs stored thereon, the computer programs, when executed by a processor, performing the above third aspect or steps of any possible data transmission method according to the third aspect.

Effects of the above data transmission system, method, service system, device, and storage medium may refer to the above explanation of the data transmission system and will not be repeated here.

The data transmission system provided by embodiments of the present disclosure include a user terminal provided for generating, in response to an input operation of a user, a virtual network console VNC operation instruction, and sending the VNC operation instruction to a data processor DPU; the DPU, hard-wired with a server and configured with a virtual display device and a virtual input device, provided for simulating, through the virtual input device, an input operation indicated by the VNC operation instruction, and transmitting generated input operation signals to the server; the server provided for generating, in response to the input operation signals, display data after receiving the input operation signals, and transmitting the display data to the DPU; the DPU is further provided for rendering the display data transmitted by the server through the virtual display device, and sending display contents resulted from the rendering to the user terminal; the user terminal is further provided for presenting the received display contents.

In other words, according to the embodiments of the present application, a DPU hard-wired with the server is configured and a virtual display device and a virtual input device are disposed on the DPU. An input operation indicated by a VNC operation instruction is simulated through the virtual input device, to generate input operation signals in a simulated manner. Such input operation signals are transmitted to the server, to enable the server to generate display data responsive to the input operation signals. The display data generated by the server are rendered by the virtual display device into display contents that can be displayed in a display interface. The display contents are then sent to a user terminal for display. In comparison to the restricted access permissions when the display interface is conventionally obtained on the basis of BMC, the embodiments of the present disclosure have no such issues due to the configuration of the virtual display device, the virtual input device and the DPU hard-wired with the server. Furthermore, the present disclosure is also characterized by convenient maintenance, timely detection of failure when occurs and targeted solutions to the failure. Therefore, the efficiency of data transmission is guaranteed The above objectives, characteristics and advantages of the present disclosure will be more easily understood by listing the following preferred embodiments. Detailed description of the preferred embodiments is also provided below with reference to the accompanying drawings.

BRIEF DESCRIPTION OF THE DRAWINGS

To describe the technical solutions in the embodiments of the present disclosure more clearly, the drawings to be used in the embodiments are briefly introduced below. The drawings here are incorporated into the description as a part of it. These drawings illustrate embodiments according to the present disclosure and further explain the technical solutions of the present application in combination with the description. It is to be understood that the following drawings only illustrate some embodiments of the present disclosure and shall not be regarded as limitations over the scope. Those skilled in the art also may obtain other related drawings from the illustrated ones without any exercises of inventive work.

DETAILED DESCRIPTION OF EMBODIMENTS

Figure 1:
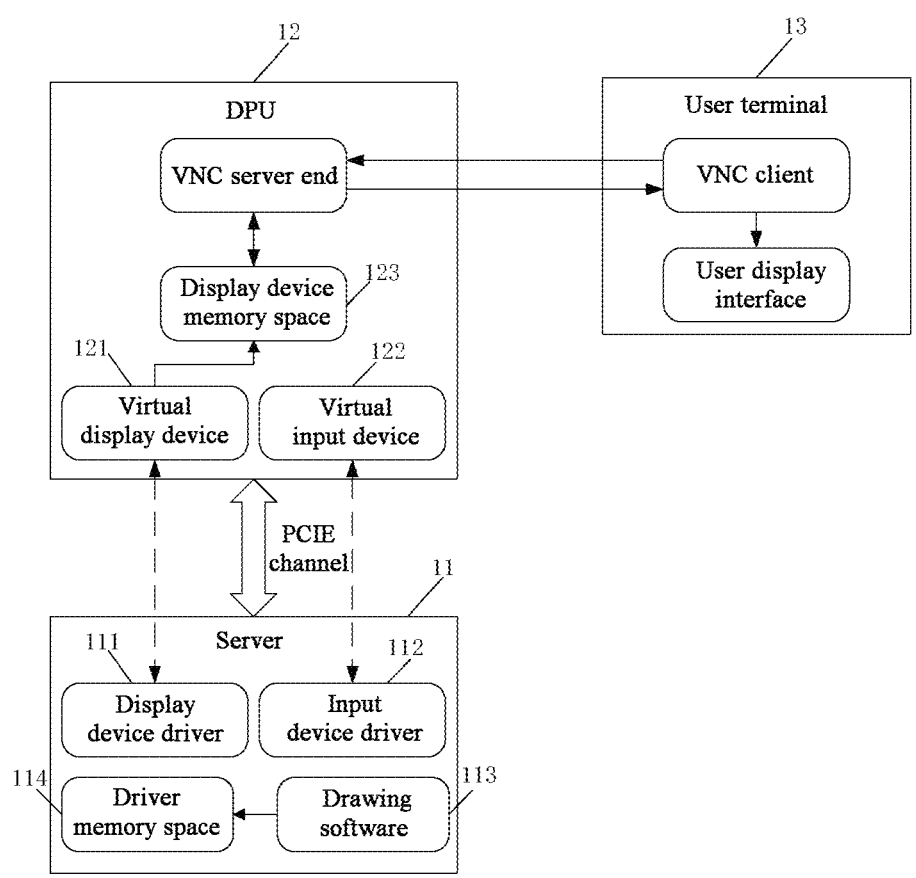
FIG. 1 illustrates a schematic diagram of a data transmission system provided by embodiments of the present disclosure.

For a clearer picture of the objectives, technical solutions and advantages of the embodiments of the present disclosure, the technical solutions in the embodiments of the present disclosure are to be described clearly and completely with reference to the drawings in the embodiments of the present disclosure. It is obvious that the described embodiments are only part of the embodiments of the present disclosure, rather than all of them. In general, components of the embodiments of the present disclosure described and illustrated here may be arranged and designed by various configurations. Thus, the following detailed description of the embodiments of the present disclosure provided in the drawings is not intended to restrict the protection scope of the present disclosure. It is merely a description of the selected embodiments of the present disclosure. All other embodiments obtained by those skilled in the art on the basis of the illustrated embodiments of the present disclosure without any exercises of inventive work fall within the protection scope of the present disclosure.

Besides, the terms "first", "second" and the like are used in the description and the claims of the embodiments of the present disclosure and in the above drawings for distinguishing the similar objects, rather than specifying a particular sequence or order. It should be appreciated that data utilized in such manner may exchange with one another in suitable cases, such that the embodiments described here can be implemented in an order other than the one illustrated or described here.

"Plural or several" stated in the text indicates two or more. The term "and/or" describes an association between related objects and suggests three relations. For example, A and/or B may indicate three scenarios, including A alone, both A and B and B alone. The character "/" usually indicates an "OR" relation between the objects linked by it.

It is investigated by research that traditional methods for operating servers through image interaction interfaces are not universal among users as the permission for calling BMC operation is quite high. For this, an application container engine Docker container is created in the prior art. Software, such as IKVM client, virtual VNC server end and VNC server end, is set up in the Docker container. Operations on the server by the image interaction interfaces are implemented via interface transmission among BMC (including IKVM) ↔ Docker container ↔ virtual network console (VNC) client. However, both BMC and Docker container are disposed external to the server, and data transmission involves long paths and is heavily dependent. In case of transmission failure, the fault issue could not be timely discovered and addressed, which may further affect efficiency of data transmission and content display.

Based on the above research, the present disclosure provides a data transmission system, in which a DPU hard-wired with the server is configured and a virtual display device and a virtual input device are disposed on the DPU. An input operation indicated by a VNC operation instruction is simulated through the virtual input device, to generate input operation signals in a simulated manner. Such input operation signals are transmitted to the server, to enable the server to generate display data responsive to the input operation signals. The display data generated by the server are rendered by the virtual display device into display contents that can be displayed in a display interface. The display contents are then sent to a user terminal for display. In comparison to the restricted access permissions when the display interface is conventionally obtained on the basis of BMC, the embodiments of the present disclosure have no such issues due to the configuration of the virtual display device, the virtual input device and the DPU hard-wired with the server. Furthermore, the present disclosure is also characterized by convenient maintenance, timely detection of failure when occurs and targeted solutions to the failure. Therefore, the efficiency of data transmission is guaranteed.

Defects in the above solutions are discovered by inventors through practice and careful research. In such case, the process of discovering the above problems and the solutions to the problems proposed by the present disclosure below should be considered as contributions of the inventors to the present disclosure.

It is to be noted: similar reference signs and letters indicate similar items in the following drawings. Therefore, once an item is defined in a drawing, no further definitions and explanations are required in the subsequent drawings.

Specific nouns mentioned in the embodiments of the present disclosure are introduced in details below:

1. Data Processing Unit (DPU), as a computing power chip, provides a computing engine for high-bandwidth, low-latency and data-intensive computing scenarios.
2. Virtual Network Console (VNC), as a remotely controlled utility software, mainly consists of two parts, i.e., client application (VNC Viewer) and server-end application (VNC server). Any Linux platform-based computers installed with client application (VNC Viewer) can conveniently connect with computers configured with server-end application (VNC server).
3. Peripheral Component Interconnect Express (PCIE) has a main advantage of high data transmission rate, including relatively high system bus throughput, relatively low I/O pin data volume and relatively small physical dimension.

To easily understand an embodiment, a data transmission system disclosed by this embodiment of the present disclosure is elaborated in the first place. FIG. 1 illustrates a schematic diagram of a data transmission system provided by embodiments of the present disclosure. The data transmission system includes a server 11, a data processor DPU12 hard-wired with the server 11 and a user terminal 13, wherein the DPU is provided therein with a virtual display device 121 and a virtual input device 122. The hard-wire connection between DPU12 and the server 12 here may specifically be bus connection, or interface connection, or an indirect connection via a switching device etc. For example, the DPU12 may be directly inserted into an interface linked to the bus of the server 11. Embodiments of the present disclosure are not restricted in this regard.

In the above data transmission system, respective devices mainly function as follows:

The user terminal 13 generates, in response to an input operation of a user, a virtual network console VNC operation instruction and sends the VNC operation instruction to a data processor DPU;

The DPU12 simulates through the virtual input device 122 an input operation indicated by the VNC operation instruction and transmits generated input operation signals to the server 11;

The server 11 generates, in response to the input operation signals, display data after receiving the input operation signals; and transmits the display data to the DPU12;

The DPU also renders display data transmitted by the server through the virtual display device and sends display contents resulted from the rendering to the user terminal;

The user terminal is further provided for presenting the received display contents.

Based on the above functions, the data transmission system provided by embodiments of the present disclosure may include two data transmission paths, wherein via a first data transmission path, operations of the user are transmitted to the server 11 from the user terminal 13; and via a second data transmission path, the server 11 generates display data responsive to the operations and returns the data to the user terminal 13.

(I) For the first data transmission path:

The user terminal 13 generates, in response to an input operation of a user, a virtual network console VNC operation instruction and sends the VNC operation instruction to a data processor DPU; the DPU12 simulates through the virtual input device 122 an input operation indicated by the VNC operation instruction and transmits generated input operation signals to the server 11; the server 11 generates, in response to the input operation signals, display data after receiving the input operation signals.

Wherein for the functions at the side of the user terminal 13, input operations of the user may be an operation executed by the user via an external input device, or an operation executed by the user via input software of the user terminal 13. The external input device here may be keyboard and mouse connected to the device of the user terminal 13, and the input software for example may be soft keyboard etc.

The user terminal 13 may run a VNC client; and the DPU12 may run a VNC server end. After starting the VNC client, the user terminal 13 may generate a VNC operation instruction in response to an input operation from the user during the running of the VNC client.

Wherein the VNC client may be an application client corresponding to VNC Viewer and the VNC server end may be an application server corresponding to VNC server end.

Before the user terminal 13 sends the VNC operation instruction to the DPU12, the DPU12 also establishes a communication connection between the VNC client and the VNC server end in response to receiving a connecting request initiated by the VNC client.

Specifically, the user terminal 13 may send a connecting request to the VNC server end in DPU12, to request establishing a communication connection between the VNC client and the VNC server end. When it is determined that a communication connection is established between the VNC client and the VNC server end, the VNC operation instruction may be sent to the VNC server end.

For the functions at the side of the DPU12, the virtual input device 122 within the CPU12 may simulate hardware operations of a physical input device, i.e., simulating input operations of the user indicated by the VNC operation instruction, e.g., keyboard operations and mouse operations etc.

During specific implementations, in case that the VNC server end receives the VNC operation instruction, the VNC operation instruction may be sent to the virtual input device 122 through the running VNC server end. Afterwards, the input operations indicated by the VNC operation instruction are simulated by the virtual input device 122 to generate input operation signals corresponding to the input operation. In other words, the VNC operation instruction are converted into input operation signals.

As an example, the virtual input device 122 may simulate keyboard and mouse operations input by the user to produce simulating signals of keyboard and mouse operations. The produced simulating signals are transmitted to the server 11. The transmission mode here may specifically be transmission by bus. For example, the transmission may be performed through the PCIE bus between the DPU12 and the server 11; or the transmission may also be performed via the interface between the DPU12 and the server 11. Embodiments of the present disclosure are not restricted in this regard.

(II) For the second data transmission path:

After generating, in response to the input operation signals, display data, the server 11 transmits the display data to the DPU12; the DPU12 renders display data transmitted by the server 11 through the virtual display device 121 and sends display contents resulted from the rendering to the user terminal 13; the user terminal 13 is further provided for presenting received display contents.

In detailed implementation, the server 11 executes, in response to the input operation signals, a corresponding input operation; the display data are generated during the execution of the corresponding input operation. For example, a character operation input by the keyboard is executed to generate character data of a control interface; or a text operation input by the keyboard is executed to generate text data of the control interface; or an operation of clicking software contents by mouse is executed to generate software display data of the server 11 during the execution of the software contents.

Here, the approach for the server 11 to transmit the display data to the DPU12 may refer to the above approach for the DPU12 to transmit the input operation signals to the server 11, and will not be repeated here.

Then, the DPU12 renders display data transmitted by the server 11 through the virtual display device 121 and sends display contents resulted from the rendering to the user terminal 13.

The virtual display device 121 provided by embodiments of the present disclosure may simulate the rendering display function of the physical display device, such as screen rendering and font feature etc.

Rendering the display data transmitted by the server 11 by the virtual display device 121 may include performing virtual screen rendering on the display data and sending the rendering result, i.e., display contents resulted from the rendering, to the user terminal 13.

In some embodiments, the user terminal 13 has a VNC client run thereon, the DPU12 has a VNC server end run thereon, the VNC client, and the VCN server end are communicatively connected. Here, the VNC server end may be VNC server.

The DPU12 runs the VNC server end after rendering the display data transmitted by the server 11 via the virtual display device 121, and sends the display contents resulted from the rendering to the VNC client via the VNC server end.

Here, after the DPU12 runs the VNC server end, the display contents resulted from the rendering by the virtual display device 121 may be directly obtained using the VNC server end. Subsequently, the VNC server end sends the obtained display contents to the VNC client through the communication connection with the VNC client.

The display contents resulted from the rendering by the virtual display device 121 may be obtained using the VNC server end. In some embodiments, the DPU12 may be provided with a corresponding display device memory space 123 for the virtual display device 121; the DPU12 is specifically provided for storing the display contents resulted from the rendering into the display device memory space 123 after rendering the display data transmitted by the server 11 through the virtual display device 121, running the VNC server end, controlling the VNC server end to read the display contents in the display device memory space 123, and sending the read display contents to the VNC client.

The user terminal 13 displays the received display contents.

Specifically, the VNC client in the user terminal 13 may receive the display contents and display the display contents at a user display interface in the user terminal 13.

On account of the hard connection between the DPU12 and the server 11, it is required to further load drive programs after the start of the server 11, to enable normal operation of the device simulated by the DPU12. The detailed procedure is as follows:

The server 11 may be configured with a display device driver 111 and an input device driver 112; the server 11 is specifically provided for loading the display device driver 111 and the input device driver 112 after start-up, driving a virtual display device 121 in the DPU12 to work through the display device driver 111, and driving a virtual input device 122 in the DPU to work through the input device driver 112.

In detailed implementation, after start-up, the server 11 sends to the DPU12 a request for obtaining device information, to determine which devices are provided in the DPU12. Specifically, it is determined whether the DPU12 includes the virtual input device 122 and the virtual display device 121. If a feedback signal is received from the virtual display device 121 in the DPU12, it is determined that the virtual display device 121 is configured in the DPU12; afterwards, a display device driver 111 may be loaded to drive the virtual display device 121 to operate. For example, the virtual display device 121 is driven to render the display data. If a feedback signal is received from the virtual input device 122 in the DPU12, it is determined that the virtual input device 122 is configured in the DPU12; afterwards, an input device driver 112 may be loaded to drive the virtual input device 122 to operate. For example, the virtual input device 122 is driven to simulate the input operation indicated by the VNC operation instruction.

In some embodiments, the server 11 is further configured with a drawing software 113 and a driver memory space 114 corresponding to the display device driver 111. Subsequent to the above process in which the server 11 generates the display data responsive to the input operation signals, the server 111 is specifically provider for calling, based on the input operation signals, the drawing software 113 to write the display data into the driver memory space 114, and reading the display data from the driver memory space 114 and transmitting to the DPU12.

In detailed implementation, the server 11 may parse the input operation signals and call drawing function plotting operation data corresponding to the drawing software 113 based on the parsed operation data to finally generate the display data. Then, the generated display data are written into the driver memory space 114. Subsequently, the server 11 may read the display data from the driver memory space 114 and transmit the read display data to the virtual display device 121 in the DPU12.

As an example, the parsed operation data may be key values input by the user, e.g., "a", "b" and "c" etc. Then, the drawing function plotting key values are called to obtain plotted "a", "b" and "c", i.e., display data. Afterwards, the display data are written into the driver memory space 114.

Based on the above detailed description of the data transmission system disclosed by the embodiments of the present disclosure, embodiments of the present disclosure also provide a service system, comprising:

a data processor DPU, hard-wired with a server and configured with a virtual display device and a virtual input device, provided for simulating through the virtual input device an input operation indicated by a VNC operation instruction, and transmitting generated input operation signals to the server, wherein the VNC operation instruction are generated by a user terminal in response to an input operation of a user;

the server provided for generating, in response to the input operation signals, display data after receiving the input operation signals, and transmitting the display data to the DPU;

the DPU is further provided for rendering the display data transmitted by the server through the virtual display device, and sending display contents resulted from the rendering to the user terminal.

Since the principle followed by the service system in the embodiments of the present disclosure for problem solving is similar to the server and the DPU hard-wired therewith in the above data transmission system according to the embodiments of the present disclosure, implementations of the server and the DPU hard-wired therewith in the service system may refer to the implementation of the above data transmission system and will not be repeated here.

Based on the above detailed description of the data transmission system provided by the embodiments of the present disclosure, embodiments of the present disclosure also propose a data transmission method, which is generally executed by a computer device with computing power. The computer device for example includes: an integrated device integrated with the server and the DPU hard-wired with the server.

Figure 2:
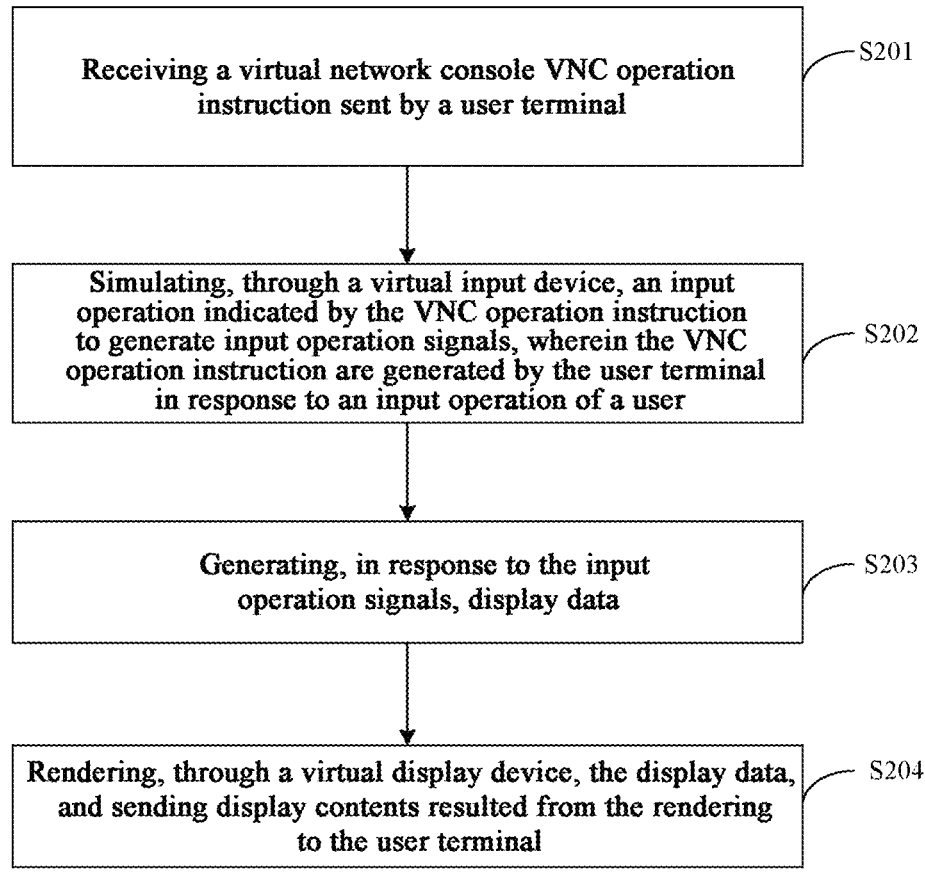
FIG. 2 illustrates a flowchart of the data transmission method provided by embodiments of the present disclosure.

FIG. 2 illustrates a flowchart of the data transmission method provided by embodiments of the present disclosure and the method includes steps S201-S204, wherein:

S201: receiving a virtual network console VNC operation instruction sent by a user terminal;

S202: simulating, through a virtual input device, an input operation indicated by the VNC operation instruction to generate input operation signals, wherein the VNC operation instruction are generated by the user terminal in response to an input operation of a user;

S203: generating, in response to the input operation signals, display data;

S204: rendering, through a virtual display device, the display data, and sending display contents resulted from the rendering to the user terminal.

Here, after the display contents resulted from the rendering are sent to the user terminal, the user terminal displays the display contents.

In an optional implementation, the user terminal has a VNC client run thereon;

sending display contents resulted from the rendering to the user terminal includes:

sending the display contents resulted from the rendering to the VNC client through a VNC server end.

Afterwards, the user terminal may display the display contents received through the VNC client.

In an optional implementation, sending the display contents resulted from the rendering to the VNC client through a VNC server end includes:

storing the display contents resulted from the rendering into a display device memory space;

reading the display contents in the display device memory space, and sending the read display contents to the VNC client.

In an optional implementation, further including, after generating, in response to the input operation signals, display data:

calling, based on the input operation signals, a drawing software to write the display data into a driver memory space;

reading the display data from the driver memory space and transmitting to the virtual display device.

In the data transmission method provided by embodiments of the present disclosure, an input operation indicated by a VNC operation instruction is simulated through the virtual input device, to generate input operation signals in a simulated manner. The display data are generated responsive to the input operation signals. The display data generated by the server are rendered by the virtual display device into display contents that can be displayed in a display interface. The display contents are then displayed on the user terminal. In comparison to the restricted access permissions when the display interface is conventionally obtained on the basis of BMC, the embodiments of the present disclosure have no such issues because of the integrated device integrated with the server and the DPU hard-wired therewith (the components within the device are also hard wired). Furthermore, the integrated device is also characterized by convenient maintenance, timely detection of failure when occurs and targeted solutions to the failure. Therefore, the efficiency of data transmission is guaranteed.

Those skilled in the art may appreciate that although the respective steps are drafted in a given order in the above method of the specific implementations, it does not mean the steps should be strictly executed in such order. Instead the drafting order makes no limitations over the implementation process. The specific execution order of the respective steps should be determined by their functions and possible internal logic.

The data transmission procedure between the respective steps in the method may refer to the related description in the above embodiments of the data transmission system and will not be repeated here.

Figure 3:
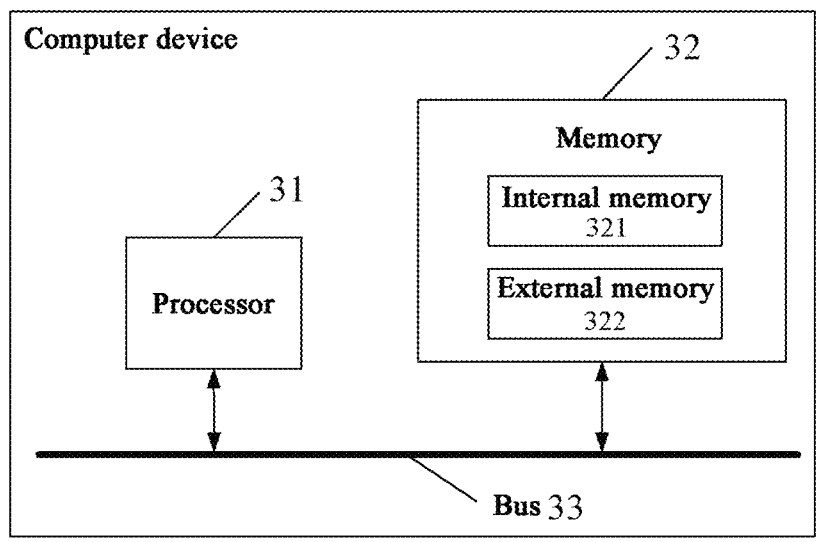
FIG. 3 illustrates a structural diagram of the computer device provided by embodiments of the present disclosure.

On the basis of the same inventive concept, embodiments of the present disclosure also provide a computer device. FIG. 3 illustrates a structural diagram of the computer device provided by embodiments of the present disclosure. The computer device includes:

A processor 31, a memory 32 and a bus 33, wherein the memory 32 stores machine-readable instructions executable by the processor 31 and the processor executes the machine-readable instructions stored in the memory 32; the machine-readable instructions, when executed by the processor 31, perform the following steps of: S201: receiving a virtual network console VNC operation instruction sent by a user terminal; S202: simulating, through a virtual input device, an input operation indicated by the VNC operation instruction to generate input operation signals, wherein the VNC operation instruction are generated by the user terminal in response to an input operation of a user; S203: generating, in response to the input operation signals, display data; S204: rendering, through a virtual display device, the display data, and sending display contents resulted from the rendering to the user terminal.

The above memory 32 consists of an internal memory 321 and an external memory 322; the internal memory 321 here is used for temporarily storing the operational data in the processor 31 and data exchanged with the external memory 322 (such as hard disk and the like). The processor 31 exchanges data through the internal memory 321 and the external memory 322. During the operation of the computer device, the processor 31 communicates with the memory 32 through the bus 33, to enable the processor 31 to perform the execution instructions mentioned in the above method embodiments.

Embodiments of the present disclosure also provide a computer-readable storage medium stored thereon with computer programs, wherein the computer programs, when operated by the processor, perform steps of the data transmission method in the above method embodiments. The storage medium may be volatile or non-volatile computer-readable storage medium.

Embodiments of the present disclosure further provide a computer program product, comprising computer instructions, which computer instructions when executed by the processor implement the steps of the above data transmission method, wherein the computer program product may be any products capable of implementing the above data transmission method. Part or all of the solutions making contributions to the prior art in the computer program product may be embodied in the form of software product (e.g., Software Development Kit, SDK). The software product may be stored in a storage medium, to enable the related device or processor to perform part or all of the steps in the above data transmission method through the included computer instructions.

It may be clearly understood by those skilled in the art that, for sake of an easy and concise description, a detailed working process of the above described method may refer to a corresponding process in the foregoing system embodiments. Details are not described herein again. In the several embodiments provided by the present disclosure, it should be understood that the disclosed system and method may be implemented in other manners. The above described apparatus embodiment is merely an example. For example, the module division is merely a division by logic function and there may be other dividing approaches in actual implementation. For another example, a plurality of modules or components may be combined, or some features may be ignored or not performed. In addition, the displayed or discussed mutual couplings or direct couplings or communication connections may be implemented through some interfaces. The indirect couplings or communication connections between the apparatuses or modules may be implemented in electrical, mechanical, or other forms.

The units described as discrete parts may or may not be physically separated, and parts displayed as units may or may not be physical units, i.e., they may be located at one position, or may be distributed over a plurality of network units. Some or all of the units may be selected based on actual requirements to fulfill the objectives of the solutions of the embodiments.

In addition, functional modules in respective embodiments of the present disclosure may be integrated into one processing module, or exist alone physically; alternatively, two or more modules may be integrated into one module.

The functions, when implemented in the form of software functional module and sold or used as an independent product, may be stored in a non-volatile computer-readable storage medium executable by the processor. Based on such understanding, the technical solutions of the present disclosure essentially, or the part of the technical solutions contributing to the prior art, or some of the technical solutions may be implemented in the form of software product. The computer software product is stored in a storage medium, and includes several instructions for enabling a computer device (which may be a personal computer, a server, a network device, or the like) to perform all or some of the steps of the methods described in the embodiments of the present disclosure. The foregoing storage medium includes any medium that can store program codes, such as USB flash drive, mobile hard disk, Read-Only Memory (ROM), Random Access Memory (RAM), magnetic disk, or optical disc.

In the end, it should be noted that the above embodiments are merely specific implementations of the present disclosure and intended to explain the technical solutions of the present disclosure, rather than restricting them. The protection scope of the present disclosure is not restricted to this. Although the present disclosure is described in details with reference to the foregoing embodiments, those ordinary skilled in the art should understand that any technical personnel familiar with the technical field can still modify the technical solutions disclosed by the above embodiments or easily conceive of the changes of these technical solutions or equivalently substitute some of the technical features therein within the technical scope disclosed by the present disclosure. However, these modifications, changes or substitutions would not deviate the corresponding technical solutions from the spirit and scope of the technical solutions according to the embodiments of the present disclosure and instead should be encompassed within the protection scope of the present disclosure. Therefore, the protection scope of the present disclosure should be subject to the protection scope of the claims.

We claim:

1. A data transmission system, characterized in comprising:
   a user terminal provided for generating, in response to an input operation of a user, a virtual network console VNC operation instruction, and sending the VNC operation instruction to a data processor DPU;
   the DPU, hard-wired with a server and configured with a virtual display device and a virtual input device, provided for simulating, through the virtual input device, an input operation indicated by the VNC operation instruction, and transmitting generated input operation signals to the server;
   the server provided for generating, in response to the input operation signals, display data after receiving the input operation signals, and transmitting the display data to the DPU;
   the DPU is further provided for rendering the display data transmitted by the server through the virtual display device, and sending display contents resulted from the rendering to the user terminal;
   the user terminal is further provided for presenting the received display contents,
   wherein the user terminal has a VNC client run thereon, the DPU has a VNC server end run thereon, and the DPU is further provided for establishing, before receiving the VNC operation instruction sent by the user terminal, a communication connection between the VNC client and the VNC server end in response to receiving a connecting request initiated by the VNC client.

2. The system of claim 1, characterized in that, the VNC client and the VCN server end are communicatively connected;
   the DPU is provided for running the VNC server end after rendering the display data transmitted by the server through the virtual display device, and sending the display contents resulted from the rendering to the VNC client through the VNC server end;
   the user terminal is provided for displaying the display contents received by the VNC client.

3. The system of claim 2, characterized in that, the DPU is configured with a corresponding display device memory space for the virtual display device;
   the DPU is specifically provided for storing the display contents resulted from the rendering into the display device memory space after rendering the display data transmitted by the server through the virtual display device, running the VNC server end, controlling the VNC server end to read the display contents in the display device memory space, and sending the read display contents to the VNC client.

4. The system of claim 3, characterized in that, the DPU is further provided for establishing, before receiving the VNC operation instruction sent by the user terminal, a communication connection between the VNC client and the VNC server end in response to receiving a connecting request initiated by the VNC client.

5. The system of claim 1, characterized in that the server is configured with a display device driver and an input device driver;
the server is specifically provided for loading the display device driver and the input device driver after start-up, driving a virtual display device in the DPU to work through the display device driver, and driving a virtual input device in the DPU to work through the input device driver.

6. The system of claim 5, characterized in that the server is further configured with a drawing software and a driver memory space corresponding to the display device driver;
   the server is specifically provider for calling, based on the input operation signals, the drawing software to write the display data into the driver memory space, and reading the display data from the driver memory space and transmitting to the DPU.

7. A service system, characterized in comprising:
   a data processor DPU, hard-wired with a server and configured with a virtual display device and a virtual input device, provided for simulating through the virtual input device an input operation indicated by VNC operation instruction, and transmitting generated input operation signals to the server, wherein the VNC operation instruction are generated by a user terminal in response to an input operation of a user;
   the server provided for generating, in response to the input operation signals, display data after receiving the input operation signals, and transmitting the display data to the DPU;
   the DPU is further provided for rendering the display data transmitted by the server through the virtual display device, and sending display contents resulted from the rendering to the user terminal,
   wherein the user terminal has a VNC client run thereon, the DPU has a VNC server end run thereon, and the DPU is further provided for establishing, before receiving the VNC operation instruction sent by the user terminal, a communication connection between the VNC client and the VNC server end in response to receiving a connecting request initiated by the VNC client.

8. The service system of claim 7, characterized in that, the VNC client and the VCN server end are communicatively connected;
   the DPU is provided for running the VNC server end after rendering the display data transmitted by the server through the virtual display device, and sending the display contents resulted from the rendering to the VNC client through the VNC server end.

9. The service system of claim 8, characterized in that, the DPU is configured with a corresponding display device memory space for the virtual display device;
   the DPU is specifically provided for storing the display contents resulted from the rendering into the display device memory space after rendering the display data transmitted by the server through the virtual display device, running the VNC server end, controlling the VNC server end to read the display contents in the display device memory space, and sending the read display contents to the VNC client.

10. The service system of claim 9, characterized in that, the DPU is further provided for establishing, before receiving the VNC operation instruction sent by the user terminal, a communication connection between the VNC client and the VNC server end in response to receiving a connecting request initiated by the VNC client.

11. The service system of claim 7, characterized in that the server is configured with a display device driver and an input device driver;

the server is specifically provided for loading the display device driver and the input device driver after start-up, driving a virtual display device in the DPU to work through the display device driver, and driving a virtual input device in the DPU to work through the input device driver.

12. The service system of claim 11, characterized in that the server is further configured with a drawing software and a driver memory space corresponding to the display device driver;

the server is specifically provider for calling, based on the input operation signals, the drawing software to write the display data into the driver memory space, and reading the display data from the driver memory space and transmitting to the DPU.

13. A data transmission method, characterized in comprising:

receiving a virtual network console VNC operation instruction sent by a user terminal;

simulating, through a virtual input device, an input operation indicated by the VNC operation instruction to generate input operation signals, wherein the VNC operation instruction are generated by the user terminal in response to an input operation of a user;

generating, in response to the input operation signals, display data;

rendering, through a virtual display device, the display data, and sending display contents resulted from the rendering to the user terminal;

after generating, in response to the input operation signals, display data:

calling, based on the input operation signals, a drawing software to write the display data into a driver memory space;

reading the display data from the driver memory space and transmitting to the virtual display device.

14. The method of claim 13, characterized in that, the user terminal has a VNC client run thereon;

sending display contents resulted from the rendering to the user terminal includes:

sending the display contents resulted from the rendering to the VNC client through a VNC server end.

15. The method of claim 14, characterized in that, sending the display contents resulted from the rendering to the VNC client through a VNC server end includes:

storing the display contents resulted from the rendering into a display device memory space;

reading the display contents in the display device memory space, and sending the read display contents to the VNC client.

* * * * *